(12) United States Patent
Gust et al.

(10) Patent No.: US 7,073,656 B2
(45) Date of Patent: Jul. 11, 2006

(54) METHOD AND APPARATUS FOR REMOVING HOLES FROM NESTED PRODUCT PATTERNS

(75) Inventors: Ronald Matthew Gust, Miltona, MN (US); David Leon Anderson, Alexandria, MN (US); Glenn Lambert Stroeing, Alexandria, MN (US); Paul Howard Wagner, Alexandria, MN (US)

(73) Assignee: Douglas Machine, Inc., Alexandria, MN (US)

( * ) Notice: Subject to any disclaimer, the term of this patent is extended or adjusted under 35 U.S.C. 154(b) by 53 days.

(21) Appl. No.: 10/970,257

(22) Filed: Oct. 21, 2004

(65) Prior Publication Data

US 2006/0086591 A1    Apr. 27, 2006

(51) Int. Cl.
*B65G 47/26* (2006.01)
(52) U.S. Cl. .................. 198/453; 198/452; 198/443
(58) Field of Classification Search ............... 198/452, 198/453, 454, 443, 436, 448
See application file for complete search history.

(56) References Cited

U.S. PATENT DOCUMENTS

| | | | |
|---|---|---|---|
| 1,196,442 A | 8/1916 | Eick ............................ 15/320 |
| 1,874,669 A | 8/1932 | Wagner | |
| 2,050,547 A | 8/1936 | Thayer | |
| 2,678,151 A | 5/1954 | Geisler | |
| 2,756,553 A | 4/1956 | Ferguson et al. | |
| 2,918,765 A | 12/1959 | Currivan | |
| 2,941,650 A | 6/1960 | Clinton ........................ 198/30 |
| 2,971,309 A | 2/1961 | Miskel et al. | |
| 3,108,679 A | 10/1963 | Woody .................... 198/468.6 |
| 3,201,912 A | 8/1965 | Wozniak | |
| 3,210,904 A | 10/1965 | Banks | |
| 3,279,580 A | 10/1966 | Englander | |
| 3,310,151 A | 3/1967 | Carter ......................... 198/32 |
| 3,323,281 A | 6/1967 | Talbot | |
| 3,444,980 A | 5/1969 | Wiseman | |
| 3,483,668 A | 12/1969 | Frost et al. | |
| 3,513,623 A | 5/1970 | Pearson | |
| 3,524,295 A | 8/1970 | Spaulding | |
| 3,555,770 A | 1/1971 | Rowekamp | |
| 3,579,956 A | 5/1971 | Hoffmann et al. | |
| 3,645,068 A | 2/1972 | Langen | |
| 3,660,961 A | 5/1972 | Ganz | |
| 3,767,027 A | 10/1973 | Pund et al. | |
| 3,778,959 A | 12/1973 | Langen et al. | |

(Continued)

FOREIGN PATENT DOCUMENTS

DD          239392          9/1986

(Continued)

OTHER PUBLICATIONS

US 5,457,940, 10/1995, Ziegler et al. (withdrawn)

*Primary Examiner*—James R. Bidwell
(74) *Attorney, Agent, or Firm*—Alan D. Kamrath; Nikolai & Mersereau, P.A.

(57) ABSTRACT

Holes are removed from nested product patterns by conveying products on a conveyance mechanism (12) through an infeed section (14) in nested pattern streams (a1, a2, b1, b2), into a narrowing section (24) of a width less than one and one half the product diameter. After the narrowing section (24), the product streams (a11, a21, b11, b21) enter into an expansion section (44) where products move into a side-by-side product stream (a12, a22, b12, b22). Thereafter, nested product streams (a13, a23, b13, b23) are formed, which can be combined to form nested product streams (A, B) which can be further processed as desired.

20 Claims, 3 Drawing Sheets

U.S. PATENT DOCUMENTS

| | | |
|---|---|---|
| 3,805,476 A | 4/1974 | Kawamura et al. |
| 3,826,058 A | 7/1974 | Preisig |
| 3,938,650 A | 2/1976 | Holt |
| 3,941,236 A | 3/1976 | Hagedorn |
| 3,956,868 A | 5/1976 | Ganz et al. ............... 53/48.1 |
| 3,979,878 A | 9/1976 | Berney |
| 4,041,677 A | 8/1977 | Reid |
| 4,237,673 A | 12/1980 | Calvert et al. |
| 4,385,482 A | 5/1983 | Booth |
| 4,421,229 A | 12/1983 | Pan et al. |
| 4,469,219 A | 9/1984 | Cosse ................. 198/460.2 |
| 4,479,574 A | 10/1984 | Julius et al. |
| 4,555,892 A | 12/1985 | Dijkman |
| 4,566,248 A | 1/1986 | Cooley .................... 53/48.9 |
| 4,611,705 A | 9/1986 | Fluck |
| 4,642,927 A | 2/1987 | Zamacola |
| 4,721,419 A | 1/1988 | Lenhart ................... 406/88 |
| 4,768,329 A | 9/1988 | Borrow |
| 4,802,324 A | 2/1989 | Everson |
| 4,815,251 A | 3/1989 | Goodman |
| 4,832,178 A | 5/1989 | Anderson et al. ......... 198/461 |
| 4,844,234 A | 7/1989 | Born et al. |
| 4,887,414 A | 12/1989 | Arena .................. 198/418.7 |
| 4,895,245 A | 1/1990 | Bauers et al. |
| 4,936,077 A | 6/1990 | Langen et al. |
| 4,961,488 A | 10/1990 | Steeghs ................... 198/357 |
| 4,962,625 A | 10/1990 | Johnson, Jr. et al. |
| 5,012,916 A | 5/1991 | Cruver |
| 5,036,644 A | 8/1991 | Lashyro et al. |
| 5,070,992 A | 12/1991 | Bonkowski |
| 5,201,823 A | 4/1993 | Pazdernik ............. 198/419.3 |
| 5,228,550 A * | 7/1993 | Munch .................. 198/453 |
| 5,237,795 A | 8/1993 | Cheney et al. |
| 5,241,806 A | 9/1993 | Ziegler et al. |
| 5,347,796 A | 9/1994 | Ziegler et al. |
| 5,437,143 A | 8/1995 | Culpepper et al. |
| 5,456,058 A | 10/1995 | Ziegler |
| 5,469,687 A | 11/1995 | Olson |
| 5,477,655 A | 12/1995 | Hawley |
| 5,546,734 A | 8/1996 | Moncrief et al. |
| 5,579,895 A | 12/1996 | Davis, Jr. et al. .......... 198/456 |
| 5,630,311 A | 5/1997 | Flix |
| 5,638,663 A | 6/1997 | Robinson et al. |
| 5,666,789 A | 9/1997 | Ziegler |
| 5,667,055 A | 9/1997 | Gambetti .............. 198/419.3 |
| 5,727,365 A | 3/1998 | Lashyro et al. |
| 5,755,075 A | 5/1998 | Culpepper |
| 5,765,336 A | 6/1998 | Neagle et al. |
| 5,778,634 A | 7/1998 | Weaver et al. |
| 5,937,995 A * | 8/1999 | Hartness et al. ............. 198/445 |
| 6,058,679 A | 5/2000 | Ziegler et al. .............. 53/448 |
| 6,202,827 B1 | 3/2001 | Drewitz |
| 6,561,340 B1* | 5/2003 | Reatti ..................... 198/454 |
| 6,793,064 B1 | 9/2004 | Schoeneck et al. ...... 198/419.3 |
| 2003/0183484 A1 | 11/2003 | Peterman et al. |
| 2003/0234156 A1 | 12/2003 | Schoeneck |

FOREIGN PATENT DOCUMENTS

| | | | |
|---|---|---|---|
| DE | 1247216 | 8/1967 | |
| DE | 43 32 435 A1 | 3/1995 | |
| EP | 0659664 | 6/1995 | |
| FR | 2665424 | 2/1992 | |
| JP | 1162621 | 6/1989 | .............. 198/418.7 |
| JP | 5170332 | 7/1993 | |

\* cited by examiner

METHOD AND APPARATUS FOR REMOVING HOLES FROM NESTED PRODUCT PATTERNS

BACKGROUND

The present invention generally relates to apparatus and methods for ensuring that products being conveyed in nested patterns do not include holes in the nested pattern.

Products are often packaged in a grid pattern inside of a film overwrap or a corrugated wrap for shipping, handling and storage. Of course, if one or more of the products are missing when the film overwrap or corrugated wrap is sealed, this creates a defective package which is disadvantageous to the manufacturer of the products for several reasons. Products are loaded into the package by machines, with minimal labor involved such that detection of incomplete cartons is difficult, and if detected, would require stopping operation for correction which is often extremely disruptive to the packaging operation and even impossible.

In a typical packaging operation, product comes to a packaging machine in a continuous stream. It is necessary to separate product into groups so that they can be further processed such as being placed into a pack pattern and/or packed into the film overwrap or the corrugated wrap. U.S. Pat. Nos. 4,832,178 and 5,201,823 represent one manner of metering product utilizing pins which are inserted between product in lanes. However, such pin metering apparatus includes pins, rails, and supports between each lane of product which are multiple, high wear, moveable components and are very difficult and expensive to change over between different products. Other metering designs which control product from the side or top also require many parts, are complex, and are difficult to adjust.

In other packaging operations, products come to a packaging machine in a continuous stream of a plurality of products in a nested pattern which are then arranged into a grid pattern which is separated from the continuous stream of products. U.S. Pat. No. 6,793,064 and U.S. Publication Nos. 2003/0183484 and 2003/0234156 represent one manner of metering patterned products. It is believed that such methods are advantageous over lane type metering due to increased operational speeds, reduced machine complexity, increased machine life, reduced machine maintenance and the like. However, metering products from patterns are more prone to missing products (or holes) in the pattern of the continuous stream of products.

Thus, a need has arisen for methods and apparatus for removing holes in the pattern of nested products to ensure that when the patterned products are being metered that the pattern is complete and specifically that products are not missing from the pattern.

SUMMARY

The present invention solves this need and other problems in the field of removing holes from patterns of nested, individual, generally cylindrical shaped products by providing, in a preferred form, apparatus and methods where at least a first stream of products are conveyed in a nested pattern of three columns into a narrowing section where the stream is unnested, then into an expansion section where product can travel in a side-by-side relation and then renested into a final nested pattern of two columns. The final nested pattern can be further processed downstream including, but not limited to, being combined with other streams of products of a single column or in nested patterns. In preferred aspects of the present invention, the narrowing section includes butterfly guides formed by first and second wings having downstream ends which are moveable relative to each other perpendicular to the conveyance direction and in the most preferred form are pivotable about their upstream ends.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
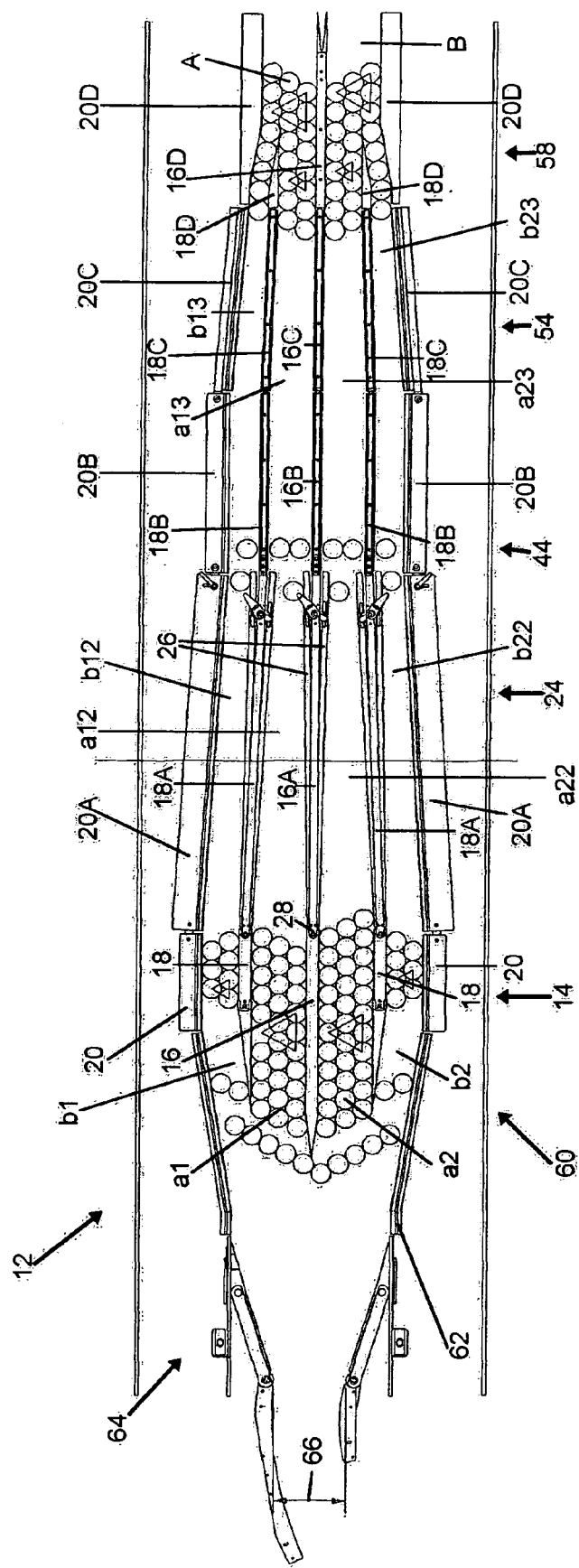
FIG. 1 shows a plan view of an apparatus for removing holes from nested product patterns and utilizing methods according to the preferred teachings of the present invention for creating dual nested product streams including three columns.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

An apparatus for removing holes from patterns of nested products, constructed and utilizing methods according to the preferred teachings of the present invention, is shown in the drawings and generally designated 10. The apparatus 10 according to the teachings of the present invention includes a conveyance mechanism 12 that conveys product in a conveyance direction. In the preferred form, the products being conveyed are individually separated from each other and are generally cylindrical in shape and having a diameter that is parallel to a bottom end of the individual product. Individual products could be cans, bottles, jars or the like and are conveyed in an upright position and standing on and supported by the bottom end on the conveyance mechanism 12.

Figure 2:
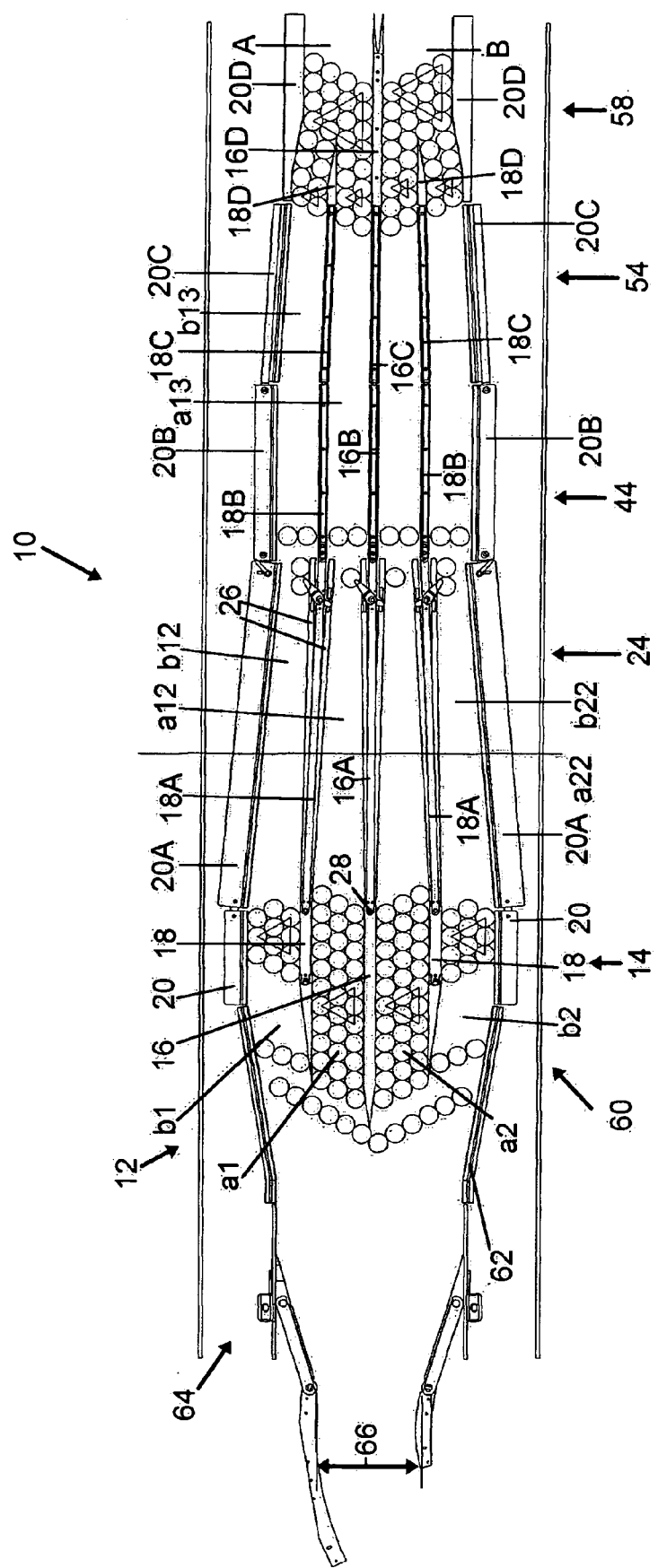
FIG. 2 shows a plan view of the apparatus of FIG. 1 converted to create dual nested product streams having four columns.
Figure 3:
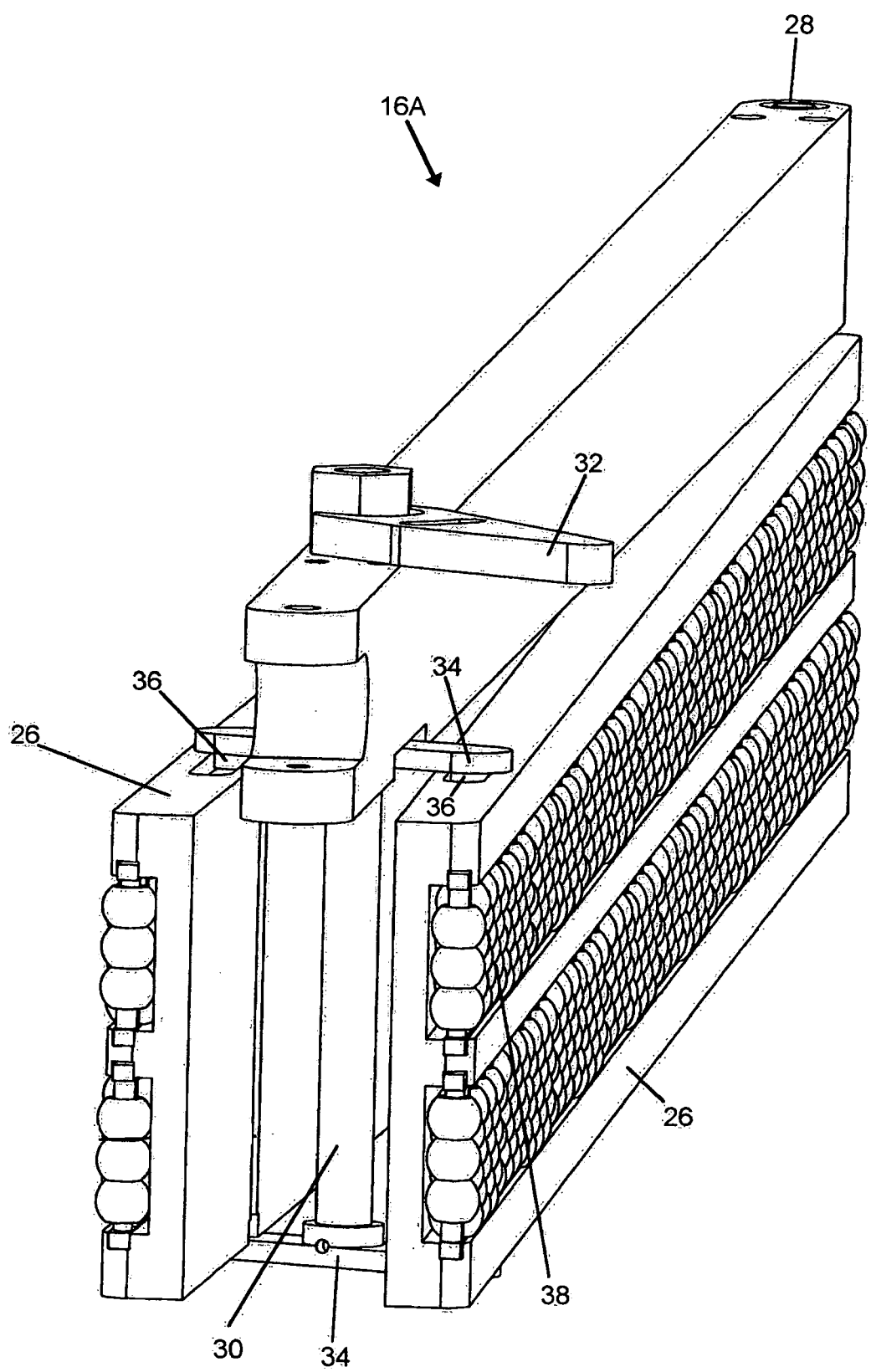
FIG. 3 shows a partial, perspective view of a butterfly type guide of the apparatus of FIG. 1, with portions of the product streams being removed for clarity.

Apparatus 10 according to the preferred teachings of the present invention includes an infeed section 14 for creating one or more nested pattern streams a1, a2, b1 and b2, with at least one of the streams a1, a2, b1 and b2 including at least three columns extending in a direction perpendicular to the conveyance direction and a multiplicity of rows extending parallel to the conveyance direction. It should be appreciated that nested product streams including three columns will form six-nested product triangle patterns as shown in FIGS. 1 and 2. Likewise, nested product streams including two columns will form three-nested product triangle patterns as also shown in FIGS. 1 and 2. Likewise, nested product streams including four columns will form nine-nested product triangle patterns as shown in FIG. 2. In the most preferred form, section 14 of apparatus 10 includes a center rail 16 having a double wedge leading edge with an equal number of streams a1 and a2 and streams b1 and b2 on opposite sides thereof. Section 14 further includes first and second guides 18 on opposite sides of center rail 16 to define first and second streams a1 and b1 on opposite sides of center rail 16. In the case where more than two streams a1 and b1 are desired on opposite sides of center rail 16, guides 18 include a wedge leading edge opposite to center rail 16. In the preferred form shown, section 14 further includes third and fourth guides 20 on opposite sides of center rail 16 and first and second guides 18 to define third and fourth streams a2 and b2.

Center rail 16 is located centrally of the conveyance mechanism 12. Guides 18 and 20 are arranged parallel to the center rail 16 and are adjustable at differing spacings therefrom. As guides 18 and 20 are parallel to rail 16 and to the conveyance direction, adjustment can be accomplished by any variety of techniques including but not limited to conventional manners which are known or will be known to persons skilled in the art. In the form shown, guides 18 are positioned relative to center rail 16 at a spacing to capture nested pattern streams a1 and b1 including at least three columns according to the teachings of the present invention. Guides 20 are positioned relative to guides 18 at a spacing to capture nested pattern streams a2 and b2 of two or three columns according to the preferred teachings of the present invention or even a single product stream, if desired.

Apparatus 10 according to the preferred teachings of the present invention includes a narrowing section 24 for unnesting streams a1, a2, b1 and b2 into unnested streams a11, a21, b11 and b21. In particular, narrowing section 24 includes butterfly guides 16A and 18A located down stream of center rail 16 and guides 18, respectively. In particular, each guide 16A and 18A includes first and second wings 26 each having an upstream end pivotally connected to rail 16 and guides 18, respectively, about a vertical axis 28. Due to this connection, the upstream ends of guides 18A are adjustable with adjustment of guides 18. The thickness of each guide 16A and 18A at its downstream end is adjustable from generally equal to the thickness at its upstream end to greater than the thickness at its upstream end. Specifically, in the preferred form, the thickness of the downstream end can be adjusted by pivoting wings 26 about axis 28. In the most preferred form, wings 26 are pivoted by rotation of a vertical shaft 30 arranged parallel to and spaced from axis 28 such as by pushing on a crank arm 32 by a suitable linkage. Upper and lower diametric arms 34 extend diametrically from shaft 30 above and below wings 26. First and second cam pins 36 extend from the free ends of arms 34 parallel to but spaced from shaft 30 and are received in cam tracks formed in the upper and lower edges of wings 26. Thus, by pivoting shaft 30, arms 34 can be arranged to be almost parallel to the conveyance direction and at various angles up to 90° to the conveyance direction. As the cam pins 36 are within the cam grooves of wings 26, the downstream ends of wings 26 are moved away from shaft 30 as arms 34 are pivoted from an almost parallel orientation to an angled orientation to the conveyance direction such that wings 26 are also pivoted from an orientation parallel to the conveyance direction to an angled orientation to the conveyance direction. In the most preferred form, the backside of wings 26 can include a channel for receipt of shaft 30 when arms 34 are almost parallel to and wings 26 are parallel to the conveyance direction to minimize the thickness of guides 16A and 18A. Further, in the preferred form, the front side of wings 26 can include a nested arrangement of spherical bearings 38 against which product can move to reduce sliding friction along wings 26.

In the preferred form, narrowing section 24 further includes guides 20A located downstream of guides 20. The upstream ends of guides 20A are connected to the downstream ends of guide 20 and thus are adjustable with guides 20.

Apparatus 10 according to the preferred teachings of the present invention includes an expansion section 44 for allowing conveyance of products in side-by-side products streams a12, a22, b12 and b22. In particular, expansion section 44 includes guides 16B, 18B and 20B arranged in a parallel, spaced arrangement. Guides 18B and 20B are adjustable at differing spacings from guide 16B and are parallel to the conveyance direction such that adjustment can be accomplished by any variety of techniques including but not limited to conventional manners which are known or will be known to persons skilled in the art. In the preferred form shown, shafts 30 of guides 16A and 18A are mounted to the upstream ends of guides 16B and 18B and the downstream ends of guides 20A are mounted to the upstream ends of guides 20B. Thus, the downstream ends of guides 18A and 20A are adjustable with adjustment of guides 18B and 20B.

Apparatus 10 according to the preferred teachings of the present invention includes a nesting section 54 for conveyance of product in nested streams a13, a23, b13 and b23. In particular, nesting section 54 includes guides 16C, 18C and 20C, with guide 16C being parallel to the conveyance direction and guides 18C and 20C arranged at a nonparallel angle to the conveyance direction. The spacing between the upstream ends of guides 16C, 18C and 20C is generally equal to the spacing between downstream ends of guides 16B, 18B and 20B and are adjustable therewith. The spacing between the downstream ends of guides 16C, 18C and 20C is generally equal to the width of the nested pattern of nested streams a13, a23, b13 and b23.

Apparatus 10 according to the teachings of the present invention includes a combining section 58 for combining streams a13 and a23 and streams b13 and b23 into combined streams A and B in the preferred form. In particular, section 58 includes rail 16D extending from guide 16C parallel to the conveyance direction. Section 58 further includes guides 18D including a wedge trailing edge opposite to center rail 16 to decrease their thickness from equal to guides 18C to an edge. Section 58 further includes guides 20D including a wedge leading edge portion parallel to the wedge trailing edge of guides 18D and a trailing edge portion parallel to guide 16D.

Downstream of combining section 58, suitable provisions can be provided to separate streams A and B into individual spaced streams or to combine streams A and B into a single stream for further processing as desired.

According to the teachings of the present invention, streams a1, b1, a2 and b2 are introduced by any suitable manner into infeed section 14. In apparatus 10 shown where product is being fed parallel to and aligned with the conveyance direction of conveyance mechanism 12, the conveyance mechanism 12 has an input or dividing section 60 with first and second outer rails 62 to constrain accumulated product, with rails 62 extending upstream from guides 20. The accumulated product generally would be a mass flow of product supplied by an infeed conveyor or the like. In the most preferred form according to the teachings of the present invention, the mass flow of product would enter the section 60 through an infeed area 64 upstream of the section 60. The infeed area 64 has a choke width 66 perpendicular the conveyance direction. The choke width 66 correlates to the width of the nested streams A and B, and the choke width 66 in the preferred form being in the order of ⅔ the width of streams A and B. It should be appreciated that product can be introduced into infeed section 14 to create streams a1, b1, a2 and b2 by other manners than the preferred form of dividing section 60 shown. As an example, where product is being fed at a nonparallel angle to the conveyance direction of conveyance mechanism 12 (i.e., around a corner) such that pressure from the advancing product can be controlled, the need for choke width 66 and/or the constraint of accumulated product can be removed or accomplished by other manners to create streams a1, b1, a2 and b2 of infeed section 14 of apparatus 10 of the present invention.

It should be appreciated that apparatus 10 is often not dedicated to a single product but is utilized for differing products at various times. As an example, apparatus 10 could be utilized to process cans of a first size for a period of time and then converted to process cans or bottles of a different size for a later period of time. Apparatus 10 may be easily converted to different product sizes according to the preferred teachings of the present invention, with such conversions being done manually or with assistance of mechanical/electrical mechanisms. Specifically, initially, guides 16, 16A, 16B, 16C and 16D are positioned at the center of conveyance mechanism 12 and parallel to the conveyance direction. After initial set up, guides 16, 16A, 16B, 16C and 16D should always be in such position and should not require adjustment.

To convert apparatus 10 according to the preferred teachings of the present invention to the product desired to be processed, three products are placed in the final nested pattern in section 58 against both sides of guide 16D, and guides 18D are adjusted to abut with the final nested pattern. Likewise, if streams A and B of greater than two columns are desired, products are placed in section 58 in the combined nested pattern (such as 6 or 9 in a triangle) against both sides of guides 16D downstream of guides 18D, and guides 20D are adjusted to abut with the combined nested pattern.

Continuing with the conversion of apparatus 10 according to the preferred teachings of the present invention, two products are placed in section 44 in a side-by-side column against both sides of guide 16B, and guides 18B are adjusted to be slightly wider (0.25 inches (0.63 cm) in the preferred form) than the side-by-side products. Likewise, depending upon the selected combined nested pattern, products (such as 1 or 2) are placed in section 44 in side-by-side columns against rails 18B opposite to guide 16B, and guides 20B are adjusted to be slightly wider (0.25 inches (0.63 cm) in the preferred form) than the side-by-side products. Due to their inconnection, guides 18C and 20C are simultaneously moved with adjustment of guides 18B and 20B, but the downstream ends thereof must be aligned with guides 20C and 20D and locked in place.

Continuing with the conversion of apparatus 10 according to the preferred teachings of the present invention, six products are placed in nested triangle pattern in section 14 against both sides of rail 16, and guides 18 are adjusted to abut with the six-nested triangle pattern. Likewise, depending upon the selected combined nested pattern, products (such as three or six) are placed in section 14 in a triangle nested pattern against guides 18 opposite rail 16, and guides 20 are adjusted to abut the triangle nested pattern.

Continuing with the conversion of apparatus 10 according to the preferred teachings of the present invention, the downstream ends of wings 26 of guides 16A and 18A are moved by pivoting shaft 30 until the spacing between wings 26 of guide 16A and 18A is generally equal to one and one-half of the diameter of the products. Likewise, guides 20A are moved until the spacing between guides 20A and the wings 26 of guide 18A is generally equal to one and one-half of the diameter of the products if a six-triangle nested pattern is placed between guides 18 and 20 or is generally slightly larger than one diameter of the products if a three-triangle nested pattern is placed between guides 18 and 20.

Continuing with the conversion of apparatus 10 according to the preferred teachings of the present invention, the correct amount of product in a diagonal pattern is placed in section 60 upon conveyance mechanism 12 upstream of rail 16, and outer rails 62 are adjusted to abut the diagonal pattern. Next, the choke width 66 is adjusted to be generally equal to two-thirds of both combined nested patterns of streams A and B.

On occasion, a packaging line including apparatus 10 is desired to be utilized for packaging product bundles instead of individual, generally cylindrical shaped products. In that event, wings 26 can be positioned such that the width of guides 16A and 18A at their upstream and downstream ends are equal and equal to the widths of rail 16 and guides 16B, 16C, 16D, 18, 18B, 18C and 18D. At that time, rail 16 and guides 16A–16D and rails 18–18D, respectively, are aligned and can be spaced to allow conveyance of product bundles. Thus, it is not necessary to remove apparatus 10 according to the teachings of the present invention from the packaging line if products other than individual, generally cylindrical shaped products are desired to be packaged on the packaging line. In this regard, the conveyance mechanism 12 can be formed by two conveyors shown by a line in FIGS. 1 and 2 through narrowing section 24 to allow the upstream conveyor to be stopped periodically to reduce surge pressure on provisions downstream of apparatus 10.

Now that the basic teachings of the present invention have been explained, many extensions and variations will be obvious to one having ordinary skill in the art. For example, guides 20 could include a wedge leading edge opposite to center rail 16 and further guides could be added on opposite sides of central rail 16 and guides 18 and 20 if more than four streams a1, a2, b1 and b2 are desired. In that event, guides 20A, 20B, 20C and 20D would be similarly modified and further guides added on opposite sides thereof as required.

Thus since the invention disclosed herein may be embodied in other specific forms without departing from the spirit of general characteristics thereof, some of which forms have been indicated, the embodiment described herein is to be considered in all respects illustrative and not restrictive. The scope of the present invention is to be indicated by the appended claims, rather than by the foregoing description, and all changes which come within the meaning and ranges of equivalency of the claims are intended to embraced therein.

The invention claimed is:

1. Method for removing holes from patterns of nested product comprising:

conveying at least a first stream of a plurality of individual generally cylindrical shaped products in a first nested pattern having three columns and a multiplicity of rows extending parallel to a conveyance direction, with the columns being perpendicular to the conveyance direction, with the generally cylindrical shaped products having a maximum diameter parallel to the conveyance direction, with the first nested pattern potentially having holes in the first nested pattern;

guiding the first stream from the first nested pattern into a narrowing section having a narrowed width perpendicular to the conveyance direction less than one and a half times the maximum diameter;

guiding the first stream from the narrowing section into an expanded section having an expanded width perpendicular to the conveyance direction greater than two times the maximum diameter; and guiding the first stream from the expanded section into a final nested pattern having two columns, with the final nested pattern being free of holes.

2. The method of claim 1 with guiding into the narrowing section comprising conveying the first stream between a center guide and a first guide, with at least one of the center guide and the first guide being a butterfly guide including first and second wings having upstream and downstream ends, with the downstream ends being movable relative to each other perpendicular to the conveyance direction.

3. The method of claim 2 further comprising:
conveying a second stream of a plurality of individual generally cylindrical shaped products having a multiplicity of rows extending parallel to the conveyance direction and parallel to the first stream of the plurality of individual generally cylindrical shaped products.

4. The method of claim 3 further comprising:
combining the second stream of the plurality of individual generally cylindrical shaped products with the first stream of the plurality of individual generally cylindrical shaped products in the final nested pattern into a further nested pattern with the final nested pattern.

5. The method of claim 4 with the second stream being in a second nested pattern having three columns, with the method further comprising:
guiding the second stream from the second nested pattern into a narrowing section having a narrowed width perpendicular to the conveyance direction less than one and a half times the maximum diameter;
guiding the second stream from the narrowing section into an expanded section having an expanded width perpendicular to the conveyance direction greater than two times the maximum diameter; and
guiding the second stream from the expanded section into a second final nested pattern having two columns, with the final nested pattern being free of holes.

6. The method of claim 4 with combining the second stream comprising combining the second stream of the plurality of individual generally cylindrical shaped products in a single column with the first stream of the plurality of individual cylindrical shaped products.

7. The method of claim 3 with the second stream being in a second nested pattern having three columns, with the method further comprising:
guiding the second stream from the second nested pattern into a narrowing section having a narrowed width perpendicular to the conveyance direction less than one and a half times the maximum diameter;
guiding the second stream from the narrowing section into an expanded section having an expanded width perpendicular to the conveyance direction greater than two times the maximum diameter; and
guiding the second stream from the expanded section into a second final nested pattern having two columns, with the final nested pattern being free of holes, with the second stream being on an opposite side of the center guide than the first stream.

8. The method of claim 1 further comprising:
conveying a second stream of a plurality of individual generally cylindrical shaped products having a multiplicity of rows extending parallel to the conveyance direction and parallel to the first stream of the plurality of individual generally cylindrical shaped products.

9. The method of claim 8 with the second stream being in a second nested pattern having three columns, with the method further comprising:
guiding the second stream from the second nested pattern into a narrowing section having a narrowed width perpendicular to the conveyance direction less than one and a half times the maximum diameter;
guiding the second stream from the narrowing section into an expanded section having an expanded width perpendicular to the conveyance direction greater than two times the maximum diameter; and
guiding the second stream from the expanded section into a second final nested pattern having two columns, with the final nested pattern being free of holes.

10. The method of claim 8 further comprising:
combining the second stream of the plurality of individual generally cylindrical shaped products with the first stream of the plurality of individual generally cylindrical shaped products in the final nested pattern into a further nested pattern with the final nested pattern.

11. Apparatus for removing holes from patterns of individual, nested products, with the products being generally cylindrical shaped having a maximum diameter, comprising, in combination:
a conveyance mechanism conveying a plurality of product in a conveyance direction, with the maximum diameter being parallel to the conveyance direction;
an infeed section guiding a first stream of products in a first nested pattern having three columns and a multiplicity of rows extending parallel to the conveyance direction, with the columns being perpendicular to the conveyance direction, with the first nested pattern potentially having holes in the first nested pattern;
a narrowing section downstream of the infeed section, with the narrowing section having a narrowed width perpendicular to the conveyance direction less than one and a half times the maximum diameter, with the narrowing section guiding the first stream downstream of the infeed section;
an expanded section downstream of the narrowing section, with the expanded section having an expanded width perpendicular to the conveyance direction greater than two times the maximum diameter; and
a nesting section downstream of the expanded section, with the nesting section guiding the first stream from the expanded section into a final nested pattern having two columns, with the final nested pattern being free of holes.

12. The apparatus of claim 11 with the narrowing section including at least a first butterfly guide including first and second wings having upstream and downstream ends, with the downstream ends being movable relative to each other perpendicular to the conveyance direction.

13. The apparatus of claim 12 with the infeed section guiding a second stream of products having a multiplicity of rows extending parallel to the conveyance direction and parallel to the first stream products.

14. The apparatus of claim 13 further comprising, in combination:

a combining section downstream of the nesting section, with the combining section guiding the second stream of products into a further nested pattern with the final nested pattern of the first stream of products.

15. The apparatus of claim 14 with the infeed section separately guiding the second stream of products in a second nested pattern having three columns, with the narrowing section separately guiding the second stream from the infeed section to the expanded section, with the nesting section separately guiding the second stream from the expanded section into a final nested pattern having two columns, with the final nested pattern of the second stream being free of holes.

16. The apparatus of claim 14 with the combining section guiding the second stream of products in a single column.

17. The apparatus of claim 13 with the infeed section separately guiding the second stream of products in a second nested pattern having three columns, with the narrowing section separately guiding the second stream from the infeed section to the expanded section, with the nesting section separately guiding the second stream from the expanded section into a final nested pattern having two columns, with the final nested pattern of the second stream being free of holes.

18. The apparatus of claim 11 with the infeed section guiding a second stream of products having a multiplicity of rows extending parallel to the conveyance direction and parallel to the first stream products.

19. The apparatus of claim 18 with the infeed section separately guiding the second stream of products in a second nested pattern having three columns, with the narrowing section separately guiding the second stream from the infeed section to the expanded section, with the nesting section separately guiding the second stream from the expanded section into a final nested pattern having two columns, with the final nested pattern of the second stream being free of holes.

20. The apparatus of claim 18 further comprising, in combination:

a combining section downstream of the nesting section, with the combining section guiding the second stream of products into a further nested pattern with the final nested pattern of the first stream of products.

* * * * *